Patented June 17, 1930

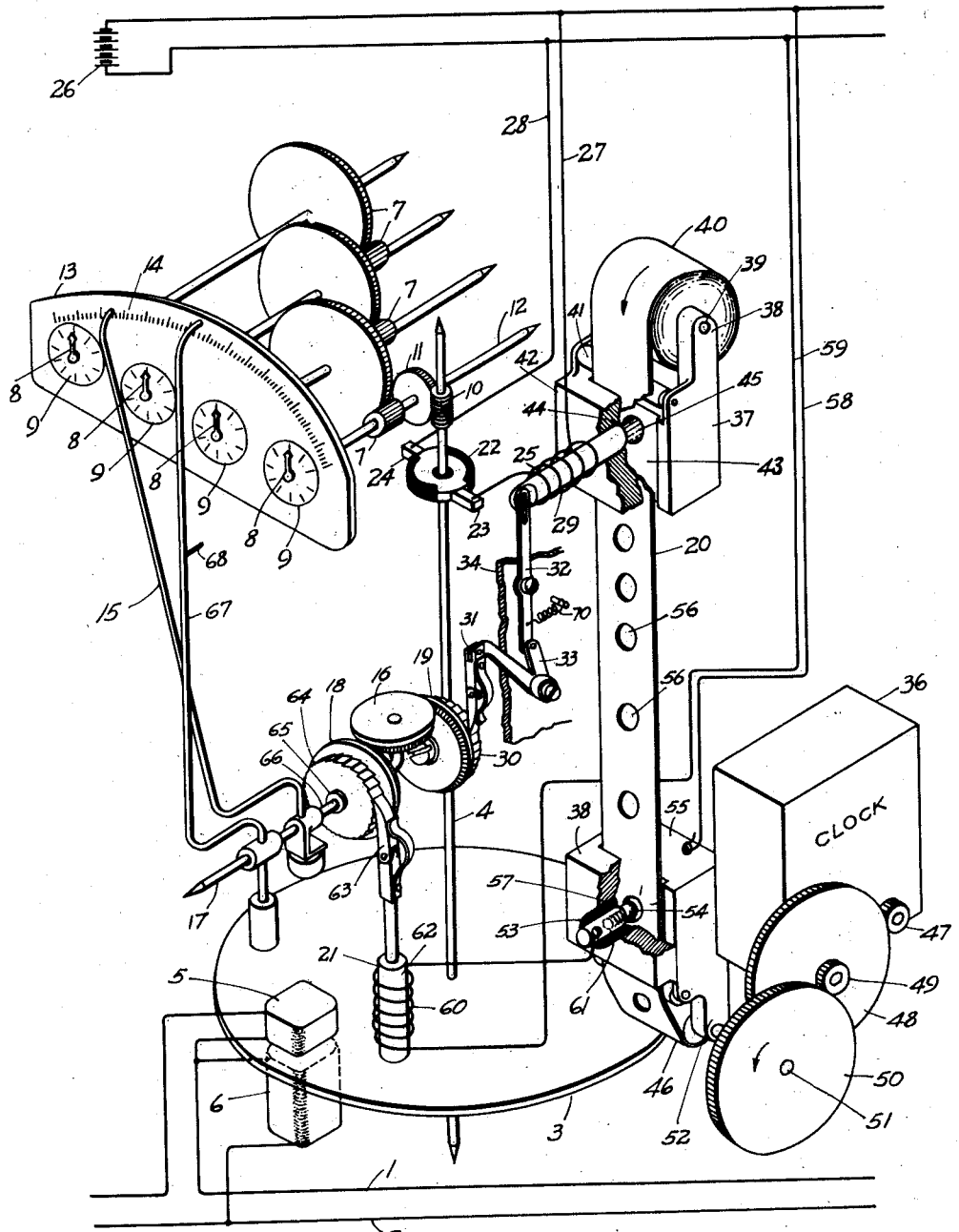

1,764,340

UNITED STATES PATENT OFFICE

CARL OMAN, OF SWISSVALE, PENNSYLVANIA, ASSIGNOR TO WESTINGHOUSE ELECTRIC & MANUFACTURING COMPANY, A CORPORATION OF PENNSYLVANIA

MAXIMUM-DEMAND METER

Application filed August 9, 1927. Serial No. 211,650.

My invention relates to electrical measuring instruments and more particularly to devices for measuring the maximum demand of a quantity, such as power traversing an electrical circuit.

It is characteristic of my invention that a continuous uninterrupted indication of the demand of a quantity then traversing an electrical circuit is provided.

A device constructed in accordance with my invention provides means whereby the demand of a quantity traversing a circuit is determinable at any time, regardless of the demand time interval.

I provide means, in accordance with the purpose of my invention, for operating members of a differential device severally, in accordance with the magnitude of a quantity, such as power traversing an electrical circuit at a given instant of time, and in accordance with the magnitude of said quantity at a predetermined former interval of time, whereby a member co-acting therewith indicates continuously the demand of said quantity.

My invention resides in the method and apparatus of the character hereinafter described and claimed, the foregoing and further characteristics of my invention being determinable from the following description.

For an understanding of my method and a description of a form my apparatus may take, reference is to be had to the accompanying drawings, in which, The single figure is an elementary diagrammatic perspective view of a maximum-demand meter constructed in accordance with my invention.

Referring to the drawings, 1 and 2 are conductors of electrical current that constitute parts of an electrical circuit utilizable, for example, for the purpose of transmitting power from an alternating-current generator (not shown) to a receiver of electrical power, such as an alternating-current motor (not shown).

It is the purpose of my invention to provide means for continuously indicating the demand of an electrical quantity, such as the power traversing the conductors 1 and 2, and, to this end, I provide a disc 3 of copper, aluminum, or the like that is mounted on a shaft 4 to be rotated in accordance with the magnitude of a quantity, such as the power traversing the conductors 1 and 2. Such rotation of the disc 3 may be effected in any suitable manner, as, for example, in the well known manner of interacting current and voltage fluxes produced by current and voltage coils 5 and 6, respectively, that are connected in electrical-circuit relation, in the usual manner, to conductors 1 and 2. The shaft 4 is mounted between suitable jewel bearings (not shown) to effect an efficient rotation thereof.

The rotations of the disc 3 may be totalized in any suitable manner, for example, by means of reduction gears 7 that are provided with the usual pointers 8 to indicate, by their relative positions on the scales 9, the total number of rotations made by the disc 3 or the total number of watt hours that have traversed the conductors 1 and 2. The shaft 4 may actuate the gear train 7 in any suitable manner as, for example, by a worm gear 10 secured to the shaft 4 and meshing with a gear wheel 11 that is secured to the shaft 12 of the gear train 7.

The upper portion of the dial register 13 is provided with a scale 14 suitably calibrated in kilowatt demand. A demand pointer 15 is rotatably mounted to co-operate with the scale 14 in accordance with the power demand traversing the conductors 1 and 2.

The demand pointer 15 is actuated by the rotational movement of a gear wheel 16 about the axis 17 to which the demand pointer 15 is secured. The gear wheel 16 co-operatively engages gear wheels 18 and 19, and rotates the shaft 17 in accordance with the difference in the rate of speed between the gear wheels 18 and 19, in a well known differential manner.

In accordance with my invention, one of the gear wheels, for example, the gear wheel 19 is rotated in accordance with the magnitude of a quantity, in this case the power traversing the conductors 1 and 2 at a predetermined instant of time, and the other gear wheel, in this case, gear wheel 18 is rotated in accordance with the magnitude of the power traversing the conductors 1 and 2 at a predetermined previous instant of time.

Any suitable means may be utilized for accomplishing the above outlined result but I prefer to perforate a constantly moving tape 20 in accordance with the speed of rotation of the disc 3 and to cause said perforations to actuate an electro-responsive device 21 to turn the gear wheel 18 in accordance with the said perforations at a predetermined constant later instant of time.

A desirable method of perforating the tape 20 and actuating the gear wheel 19 at the same time in accordance with the speed of rotation of the disc 3 comprises a circuit-contact-making-and-breaking device 22 mounted on, to turn in accordance with, the movement of the shaft 4. The contact-making device 22 is adapted to close a circuit between brushes 23 and 24 for every half revolution of the contactor 22 to energize an electro-magnetic coil 25 from a source of electrical energy, such as a battery 26, through conductors 27 and 28. The electro-magnetic coil 25 is provided with an armature 29 that operates to perforate the tape 20 every time the contacting device 22 completes the energizing circuit.

Operation of the armature 29 turns the gear wheel 19 in accordance with the speed of rotation of the disc 3 by ratchet wheel 30 that rotates the gear wheel 19, and a pawl 31 that is actuated by the armature 29, through a lever 32 and a lever 33 that are mounted on a portion 34 of the frame of the device.

An inward motion of the armature 29 produces a downward motion of the pawl 31 which, in turn, rotates a gear wheel 19 by the engagement of the former with the ratchet wheel 30. The armature 29 is normally biased away from the member 37 by a spring 70 that is secured to the arm 32 and the frame 34. In this manner, gear wheel 19 rotates in accordance with the magnitude of the power traversing the conductors 1 and 2.

The tape 20 is suitably moved, at a constant rate of speed, as by a clock 36, between an upper perforating die 37 and a lower receiving die 38. The upper perforating die 37 is provided with extensions 38 into which the shaft 39 of the tape roll 40 is journaled.

An idle roller 41 is journaled on the device 37 to permit the tape 20 to pass freely from the reel 40 between the members 42 and 43. The members 42 and 43 are mounted on the device 37 that are provided, respectively, with cored out portions 44 and 45 that are adapted to guide the armature 29 properly to perforate the tape 20. The clock 36 turns a re-roll device 46 at a predetermined constant rate of speed through gear wheel 47, gear wheel 48, gear wheel 49 and gear wheel 50. The re-roll device 46 is mounted on a shaft 51 to which the gear wheel 50 is secured that is suitably journaled to extensions 52 of the lower device 38.

Mounted in the lower device 38 is a hollow cylindrical member 53 in which is disposed a ball 54 that is resiliently biased toward the block 55, in line with the perforations 56, by a spring 57 positioned in the inner portion of the cylindrical member 53. The tape 20 is composed of insulating material and insulates the ball 54 from the block 55 between perforations, but, when a perforation permits the ball 54 to make contact with the block 55, an electrical circuit is established comprising the battery 26, conductors 58 and 59 and electro-magnetic coil 60. The member 53 is insulated from the block 55 by a layer of insulating material 61.

The electro-magnetic coil 60 constitutes a portion of the electro-responsive device and is provided with an armature 62 that actuates the gear wheel 18 in accordance with the energization of the electro-magnetic coil 60 by means of a pawl 63 secured to the armature 62 and co-operating with a ratchet wheel 64 mounted on the shaft 65 of the gear wheel 18.

The clock 36 drives the tape 20 at any predetermined constant rate of speed. Thus, for example, a period of 15 minutes may elapse between the instant that the perforation is made by the armature 29 and the instant that the same perforation permits the ball 54 to make contact with the block 55 to actuate the armature 62. If such time period be adopted, the magnitude of the power traversing the circuits 1 and 2 at a predetermined instant of time actuates the gear wheel 19, and the magnitude of power that has traversed the circuits 1 and 2 at a period of time 15 minutes earlier actuates the gear wheel 18. The gear wheel 16 turns the shaft 66, to which the demand pointer 15 is secured, in accordance with the difference in the rate of speed between the gear wheel 19 and the gear wheel 18. The demand pointer 15 provides a continuous indication of the power demand traversing the conductors 1 and 2 of the electrical circuit by its relative position on the scale 14.

An indication of the maximum demand for power that is traversing the conductors 1 and 2 is made, in the usual manner, by means of an indicating pointer 67 that is adapted to be moved by the engagement of the demand pointer 15 with an extension 68 mounted on the pointer 67. The maximum-demand pointer 67 is adapted to remain in any position to which it may be moved by the demand pointer 15 to thereby indicate the maximum travel of the demand pointer 15.

It will be readily understood that the demand pointer 15 may constitute a portion of a recording device that is adapted to provide a continuous record of the demand under consideration.

Various changes and modifications may be made in my invention without departing from the spirit and scope thereof, as set forth in the appended claims.

I claim as my invention:

1. In combination, a quantity conveyor, a time-actuated tape, means for affecting said tape in accordance with the magnitude of said quantity, a device affected by said tape at a later time, and means, including differential mechanism actuated by said device in accordance with the magnitude of said quantity, for performing an indicating function.

2. In combination, an electrical circuit, a tape, means for making perforations in said tape in accordance with the magnitude of a quantity of said circuit, an electro-responsive device actuated by said perforations at a later time, and indicating means including differential mechanism actuated by said tape.

3. In combination, an electrical circuit, a constantly moving tape, means for making perforations in said tape in accordance with a quantity traversing said electrical circuit, an electro-responsive device actuated by said perforations, at a later predetermined time, and indicating means including differential mechanism actuated by said tape.

4. A demand meter comprising a member rotatable in accordance with the magnitude of a quantity, a constantly moving tape, means for making perforations in said tape in accordance with the rotation of said member, an electro-responsive device actuated by said tape at a predetermined later period of time, and indicating means including a differential device operable in accordance with the rate at which said perforations pass a given point and the rate of operation of said electro-responsive device.

5. The combination with a conveyor of a quantity to be measured and an electro-responsive device, of means for actuating said electro-responsive device in accordance with the magnitude of said quantity at a predetermined former instant of time comprising means for perforating a constantly moving member in accordance with the magnitude of said quantity and means for operating said electro-responsive device in accordance with said perforations.

6. The combination with means for measuring a variable quantity of a source of electrical energy, of an indicator, a constantly moving member, means for physically deforming said member in accordance with said quantity, means subsequently actuated by said moving member in accordance with the deformity thereof, and means for differentially actuating said indicator in accordance with said deforming means and said actuated means.

In testimony whereof, I have hereunto subscribed my name this 3rd day of August, 1927.

CARL OMAN.